US008841021B2

(12) United States Patent
Uh

(10) Patent No.: US 8,841,021 B2
(45) Date of Patent: Sep. 23, 2014

(54) SECONDARY BATTERY

(75) Inventor: Hwa-Il Uh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 330 days.

(21) Appl. No.: 12/923,505

(22) Filed: Sep. 24, 2010

(65) Prior Publication Data

US 2011/0143191 A1    Jun. 16, 2011

(30) Foreign Application Priority Data

Dec. 14, 2009    (KR) .................. 10-2009-0123850

(51) Int. Cl.
*H01M 2/00*    (2006.01)
*H01M 2/02*    (2006.01)
*H01M 2/04*    (2006.01)

(52) U.S. Cl.
CPC .............. *H01M 2/021* (2013.01); *H01M 2/02* (2013.01); *H01M 2/04* (2013.01); *Y02E 60/12* (2013.01); *H01M 2/0413* (2013.01)
USPC ........................... 429/163; 429/177; 429/246

(58) Field of Classification Search
CPC ................................ H01M 2/02; H01M 2/04
USPC ........................................ 429/163–187, 246
See application file for complete search history.

(56) References Cited

U.S. PATENT DOCUMENTS

| 4,487,819 A * | 12/1984 | Koga ............................. 429/82 |
| 5,795,676 A | 8/1998 | Kim et al. |
| 6,197,445 B1 * | 3/2001 | Ward et al. .................... 429/163 |
| 2008/0274402 A1 * | 11/2008 | Uh ................................. 429/174 |
| 2009/0011475 A1 | 1/2009 | Sugi et al. |
| 2009/0155683 A1 * | 6/2009 | Yoo .............................. 429/163 |
| 2010/0203373 A1 | 8/2010 | Kawase et al. |

FOREIGN PATENT DOCUMENTS

| JP | 04-206164 A | 7/1992 | |
| JP | 2001229898 A * | 8/2001 | ............ H01M 2/10 |
| JP | 2007-191446 A | 8/2007 | |
| JP | 2009-026704 A | 2/2009 | |
| KR | 10-0207570 B1 | 7/1999 | |
| KR | 10 2001-0048103 A | 6/2001 | |
| KR | 10-2007-0097856 A | 10/2007 | |
| WO | WO 2009/014121 A1 | 1/2009 | |

OTHER PUBLICATIONS

Google translation of foreign published reference JP 2001-229898, Published Aug. 24, 2001, english translation obtained Aug. 7, 2013.*
Office Action issued in corresponding Korean application, 10-2009-0123850, dated Apr. 28, 2011.

* cited by examiner

*Primary Examiner* — Milton I Cano
*Assistant Examiner* — Jimmy K Vo
(74) *Attorney, Agent, or Firm* — Lee & Morse, P.C.

(57) ABSTRACT

A secondary battery including a can for accommodating an electrode assembly, the can having an opening at one side thereof; a cap assembly for sealing the opening of the can; an insulation case between the electrode assembly and the cap assembly, the insulation case being disposed in an upper portion of the can; and an insertion guide protruding from an outer surface of the insulation case, and having a lower portion facing the can, the lower portion being inclined at a predetermined angle relative to the outer surface the insulation case.

11 Claims, 3 Drawing Sheets

SECONDARY BATTERY

BACKGROUND

1. Field

This application claims the benefit of priority of Korean Application Ser. No. 10-2009-0123850 filed Dec. 14, 2009. This invention relates to embodiments of a secondary battery.

2. Description of the Related Art

As miniaturization of portable electronic devices makes rapid progress, many studies have recently been conducted to develop secondary batteries for use as driving power sources for the portable electronic devices. Such secondary batteries may include, e.g., nickel-cadmium batteries, nickel-hydrogen batteries, nickel-zinc batteries, lithium secondary batteries, and the like. Among them, the lithium secondary batteries are rechargeable, compact, and large in capacity. Thus, lithium secondary batteries are widely used in high-tech electronic devices because of their high operating voltage and high energy density per unit weight.

Among lithium secondary batteries, a prismatic type secondary battery may be formed by accommodating an electrode assembly and an electrolyte in a can and by then sealing a top portion of the can with a cap assembly. The electrode assembly may include a positive electrode plate, a negative electrode plate, and a separator interposed therebetween.

SUMMARY

Embodiments are directed to a secondary battery, which represents advances over the related art.

It is a feature of an embodiment to provide a secondary battery in which insertion guides, each having an inclined lower portion, are respectively disposed on a pair of long-side surfaces of an insulation case such that the insulation case may be smoothly inserted into a can.

It is another feature of an embodiment to provide a secondary battery having a structure that prevents the insulation case from being scratched and that prevents an insertion failure of the insulation case.

At least one of the above and other features and advantages may be realized by providing a secondary battery including a can for accommodating an electrode assembly, the can having an opening at one side thereof; a cap assembly for sealing the opening of the can; and an insulation case between the electrode assembly and the cap assembly, the insulation case being disposed in an upper portion of the can; and an insertion guide protruding from an outer surface of the insulation case, and having a lower portion facing the can, the lower portion being inclined at a predetermined angle relative to the outer surface the insulation case.

The predetermined angle may be about 30 to about 70 degrees.

The insertion guide may be spaced apart from a lower surface of the insulation case by a predetermined distance.

The insulation case may have a rectangular shape in horizontal cross section, and may have a pair of short-side surfaces and a pair of long-side surfaces, the insertion guide being disposed on each of the pair of long-side surfaces.

The insertion guide may be disposed at corresponding positions of the long-side surfaces symmetrically opposite to each other.

The rectangular shape in horizontal cross section may have rounded corners.

A width of the insulation case including the insertion guides thereon may be wider than a width between inner walls of the can for facilitating a force fit of the insulation case in the can.

A plurality of insertion guides may be disposed on opposing long-side surfaces of the insulation case, the plurality of insertion guides on one of the long-side surfaces corresponding symmetrically to the plurality of insertion guides on the opposing long-side surface.

The insertion guides may extend along entire lengths of opposing sides of the outer surface of the insulation case.

At least one of the above and other features and advantages may also be realized by providing an insulation case for insulating between an electrode assembly and a cap assembly of a secondary battery, the insulation case including an insertion guide, the insertion guide protruding from an outer surface of the insulation case and having a lower portion, the lower portion being inclined at a predetermined angle relative to the outer surface the insulation case.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
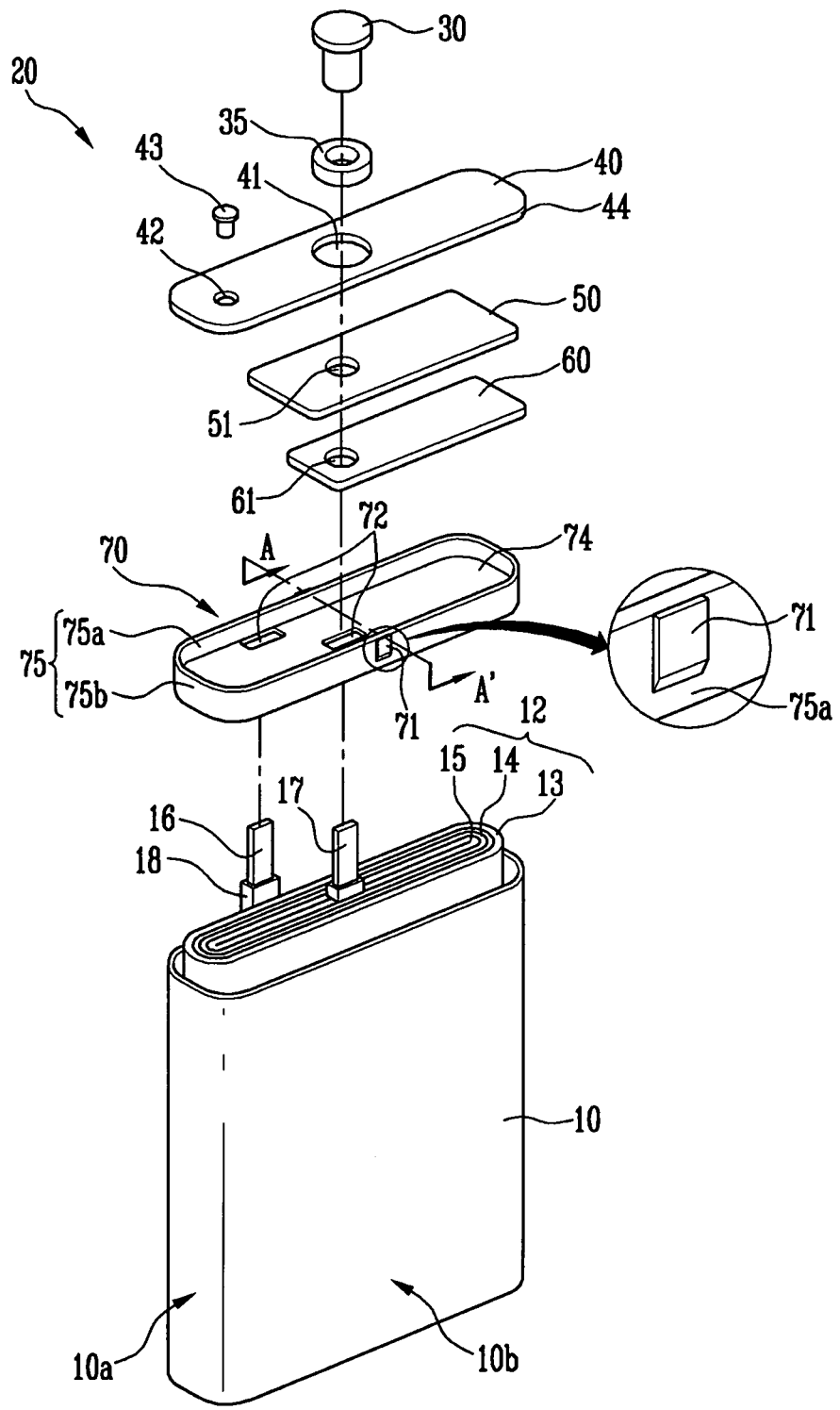
FIG. 1 illustrates an exploded perspective view of a secondary battery according to an embodiment.

Korean Patent Application No. 10-2009-0123850, filed on Dec. 14, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Also, when an element is referred to as being "connected to" another element, it can be directly connected to the another element or be indirectly connected to the another element with one or more intervening elements interposed therebetween.

FIG. 1 illustrates an exploded perspective view of a secondary battery according to an embodiment.

Referring to FIG. 1, the secondary battery according to the present embodiment may include a cap assembly 20 as well as a can 10 in which an electrode assembly 12 is accommodated. The secondary battery may further include an insulation case 70 between the electrode assembly 12 and the cap assembly 20.

Generally, the insulation case may be disposed between the electrode assembly and the cap assembly. The insulation case may be fixedly inserted, i.e., force fitted, into the top portion of the can. Holes for positive and negative electrode tabs may be formed in the insulation case. Positive and negative electrode tabs may be respectively inserted through the holes so that the insulation case prevents a short circuit between an upper portion of the electrode assembly in the can and a lower portion of the cap assembly. The insulation case may also prevent a short circuit caused by, e.g., contact of bent negative and positive electrode tabs with an inner wall of the can.

In particular, the secondary battery of the present embodiment may include the can 10 having an opening at one side thereof and in which the electrode assembly 12 may be accommodated. The cap assembly 20 may seal the opening of the can 10. The insulation case 70 may be inserted into an upper portion of the can 10 to be disposed between the electrode assembly 12 and the cap assembly 20.

A protruding insertion guide 71 may be disposed at one region of an outer surface 75 of the insulation case 70. When the secondary battery is assembled, the protruding insertion guide 71 may come into contact with the can 10. Regarding the insertion guides 71, a lower portion thereof facing the can 10 may be inclined at a predetermined angle relative to the outer surface 75 of the insulation case 70. The insertion guide 71 may be spaced apart from a lower surface 74 of the insulation case 70 by a predetermined distance. Accordingly, when the insulation case 70 is inserted into the upper portion of the can 10, a centering insertion of the insulation case 70 may be smoothly guided. Further, the presence of the insertion guides 71 may prevent the outer surface 75 of the insulation case 70 from being scratched. The insertion guide 71 may be a two-part insertion guide 71 and will hereinafter be referred to in the plural as "guides."

The insulation case 70 may have a rectangular shape in horizontal cross section. The outer surface 75 of sidewalls 73 of the insulation case 70 may include a pair of long-side surfaces 75a and a pair of short-side surfaces 75b. The pair of long-side surfaces 75a and pair of short-side surface 75b may be disposed opposite to each other, respectively. In an implementation, the insertion guides 71 may be respectively disposed on the pair of short-side surfaces 75b. Preferably, however, the insertion guides 71 are disposed on the outer sides of the pair of long-side surfaces 75a so that the centering insertion of the insulation case 70 may be smoothly guided. In an implementation, the insulation case 70 may have a rectangular shape having rounded corners in horizontal cross section. However, the shape is not limited thereto.

The insertion guides 71 on the insulation case 70 may be disposed at corresponding positions of the long-side surfaces 75a symmetrically opposite to each other. In other words, the insertion guides 71 may be disposed at symmetrically corresponding positions on opposing long-side surfaces 75a of the insulation case 70. Accordingly, it is possible to prevent the insulation case 70 from being inclined toward one of the long-side surfaces 75a when the insulation case 70 is inserted into the can 10.

The insulation case 70 may be disposed between the electrode assembly 12 and the cap assembly 20 to electrically isolate the electrode assembly 12 and the cap assembly 20. In particular, the insulation case 70 may be inserted into the upper portion of the can 10. The insulation case 70 may be formed of, e.g., a solid plastic resin having excellent electrical insulation properties. In an implementation, the insulation case 70 may be formed of, e.g., polypropylene (PP). Accordingly, when the insulation case 70 is inserted into the can 10, it may not be deformed by an electrolyte. Thus, insulation between the electrode assembly 12 and the cap assembly 20 may be easily ensured. However, when the insulation case 70 is formed of a solid plastic resin, it may be difficult to couple the insulation case 70 to the can 10 due to, e.g., weak elasticity. Therefore, the insulation case 70 may include a base portion, i.e., the lower surface 74, and a support portion, i.e., the outer surface 75, so that it may be stably coupled to the can 10.

In particular, the lower surface 74 of the insulation case 70 may have a plate shape with a predetermined thickness. The lower surface 74 of the insulation case 70 may have a shape corresponding to a horizontal cross-sectional shape of the can 10. In particular, the lower surface 74 may have a shape similar to a sectional shape of a space in the can 10 after the electrode assembly 12 is accommodated therein. The lower surface 74 of the insulation case 70 may have a slightly larger size than the section of the extra space so that it may force fitted or interference fitted into the can 10. An electrolyte injection hole (not illustrated) and lead through-holes 72 may be disposed in the lower surface 74 of the insulation case 70.

The outer surface 75 of the insulation case 70 may be integrally formed with the lower surface 74 along an edge of the lower surface 74. When the insulation case 70 is accommodated in the can 10 and the cap assembly 20 is coupled thereto, the outer surface 75 of the insulation case 70 may secure, i.e., may fill, a space between the cap assembly 20 and the lower surface 74 of the insulation case 70.

The insertion guides 71 may be respectively disposed the pair of long-side surfaces 75a of the outer surface 75 of the insulation case 70. When the insulation case 70 is force fitted into the can 10, the insertion guides 71 may facilitate insertion of the insulation case 70 into the can 10.

The electrode assembly 12 may be formed by winding a positive electrode plate 15, a negative electrode plate 13, and a separator 14 interposed therebetween. A positive electrode tab 16 may be connected to the positive electrode plate 15 to protrude upwardly from the electrode assembly 12. A negative electrode tab 17 may be connected to the negative electrode plate 13 to protrude upwardly from the electrode assembly 12. In the electrode assembly 12, the positive and negative electrode tabs 16 and 17 may be spaced apart from each other at a predetermined interval so that they are electrically isolated from each other. Portions of the positive and negative electrode tabs 16 and 17 extracted from, i.e., protruding from, the electrode assembly 12 may be wound by lamination tapes 18. The lamination tape 18 may block heat generated from the positive or negative electrode tab 16 or 17 and may prevent the electrode assembly 12 from being pressed by an edge of the positive or negative electrode tab 16 or 17.

In other words, the positive and negative electrode tabs 16 and 17 may be electrically connected to the positive and negative electrode plates 15 and 13, respectively. The positive and negative electrode tabs 16 and 17 may be extracted, i.e., may protrude, in the direction of the opening of the can 10. Thus, the positive and negative electrode tabs 16 and 17 may be electrically connected to the can 10 or a terminal plate 60 by passing through respective lead through-holes 72 of the insulation case 70 fixed to the top of the electrode assembly 12 in the can 10.

The positive and negative electrode plates 15 and 13 may be formed by respectively coating slurries on, e.g., aluminum and copper, metal foils followed by drying. The slurries may include an active material and an adhesive agent facilitating adhesion of the active material to the metal foil. In a lithium secondary battery, a positive electrode active material may include, e.g., an oxide including lithium; and a negative electrode active material may include, e.g., hard carbon, soft carbon, graphite, and/or carbon material. However, the embodiments are not limited thereto.

The can 10 may accommodate the electrode assembly 12 through the opening in the side thereof. The can 10 may have a rectangular shape having rounded corners. The can 10 may include a pair of short-side portions 10a and a pair of long-side portions 10b. However, the shape of the can 10 is not limited thereto. That is, although not illustrated in the figures, the can 10 may have, e.g., a rectangular or elliptical shape. The can 10 may be formed of a metallic material. Preferably, the can 10 includes, e.g., aluminum or aluminum alloy, which is light and flexible. The can 10 may be easily manufactured using, e.g., a deep drawing method.

The cap assembly 20 may include a cap plate 40, an electrode terminal 30, an insulation plate 50, a terminal plate 60, and a gasket 35. When the cap assembly 20 and the can 10 are coupled to each other, the cap plate 40 may seal the open side of the can 10, thereby forming a surface of the secondary battery. The cap plate 40 may be coupled the opened side of the can 10 by, e.g., welding. The cap plate 40 may be electrically connected to any one of the positive or negative electrode tabs 16 or 17 extracted by respectively passing through, i.e., protruding through, the lead through-holes 72 of the insulation case 70. A first terminal hole 41 for connecting the gasket 35 to the cap plate 40 therethrough and an electrolyte injection hole 42 for injecting an electrolyte may be disposed in the cap plate 40. The electrolyte injection hole 42 may be used as a passage for injecting the electrolyte into the can 10. After the electrolyte is injected into the can 10, the electrolyte injection hole 42 may be tightly sealed with a stopper 43.

The gasket 35 may insulate between the electrode terminal 30 and the cap plate 40. A first terminal hole 41 for connecting the electrode terminal 30 to the gasket 35 therethrough may be formed at the gasket 35, and the electrode terminal 30 may be coupled to the gasket 35 by passing through the first terminal hole 41.

The insulation plate 50 may be interposed between the cap plate 40 and the terminal plate 60 to isolate the cap plate 40 from the terminal plate 60. A second terminal hole 51 may be disposed in the insulation plate 50 so that the electrode terminal 30 may pass through the insulation plate 50.

The terminal plate 60 may be electrically connected to the electrode terminal 30 through a third terminal hole 61. The terminal plate 60 may be electrically connected to the one of the positive and negative electrode tabs 16 and 17 that is not connected to the cap plate 40. That is, when the cap plate 40 is electrically connected to the positive electrode tab 16, the terminal plate 60 may be connected to the negative electrode tab 17. Accordingly, the terminal plate 60 may relay electrical connection of the electrode terminal 30 and the negative electrode tab 17.

Figure 2:
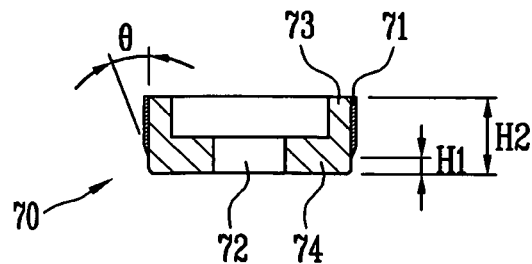
FIG. 2 illustrates a sectional view taken along line A-A' of FIG. 1.

FIG. 2 illustrates a sectional view taken along line A-A' of FIG. 1.

FIG. 2 illustrates a section parallel to the short-side surfaces 75b of the outer surface 75 of the insulation case 70 including the insertion guides 71 thereon. The insulation case 70 may include the insertion guides 71 respectively disposed on the pair of long-side surfaces 75a (see FIG. 1). The insertion guides 71 may be disposed at symmetrically corresponding positions on opposing long-side surfaces 75a of the insulation case 70.

The insertion guide 71 may be spaced apart from the lower surface 74 (see FIG. 1) of the insulation case 70 by a predetermined distance. A spacing distance H1 of the insertion guide 71 from the lower surface 74 of the insulation case 70 may be a fixed value regardless of the kind of secondary battery. For example, if the spacing distance H1 is 0.3t when an entire height H2 of the insulation case 70 is 1.4 t, the spacing distance H1 may be 0.3 t, which is constant, even when the entire height H2 is 2.0 t. That is, the spacing distance H1 may always have a constant value regardless of the entire height H2 of the insulation case 70. The spacing distance H1 may have a value at which the insertion of the insertion guide 71 may be most smoothly guided when the insulation case 70 is inserted into the can 10 (see FIG. 1).

The lower portion of the insertion guide 71, which faces the can 10, may be inclined at an angle θ relative to the outer surface 75 of the insulation case 70. The angle θ may be about 30 to about 70 degrees. Maintaining the angle θ at about 30 degrees or greater helps ensure that the insertion guide 71 has a sufficient thickness beyond the outer surface 75 of the insulation case 70, thereby ensuring that the insulation case 70 may be tightly inserted into the can 10. Maintaining the angle θ at about 70 degrees or less may help ensure that the angle made by the insertion guide 71 and the can 10 is not too close to a right angle, thereby ensuring proper function of the insertion guide 71. Thus, the lower portion of the insertion guide 71, which faces the can 10, may be inclined at an appropriate angle, so that it is possible to prevent insertion failure of the insulation case 70 and to precisely guide centering insertion of the insulation case 70.

Figure 3:
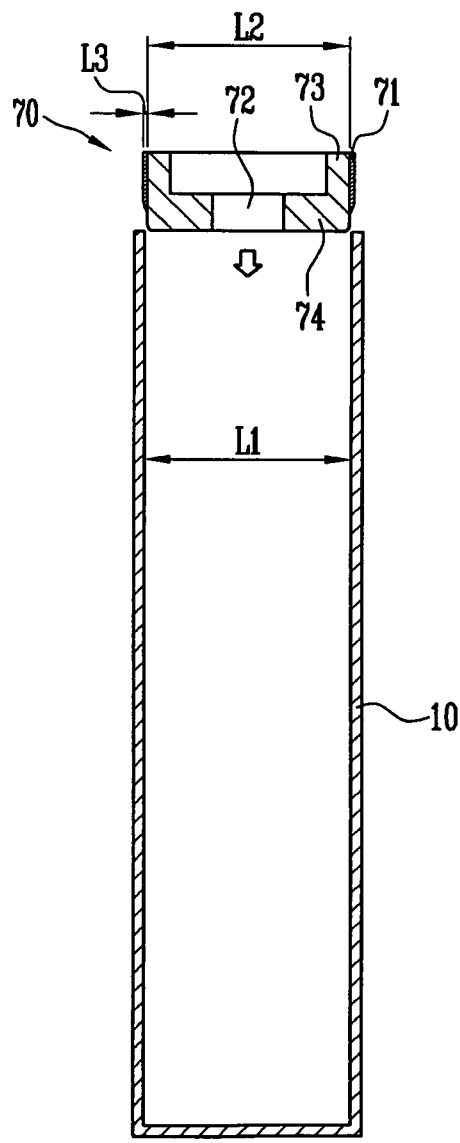
FIG. 3 illustrates a sectional view of a state of assembly before an insulation case is inserted into a can according to an embodiment.
Figure 4:
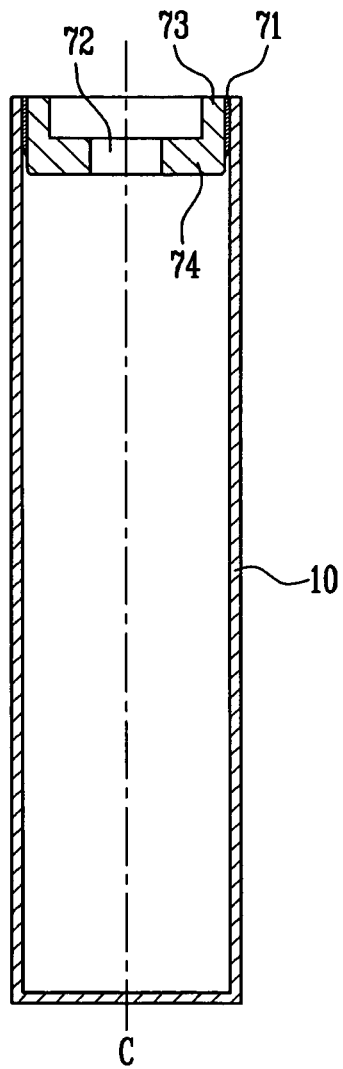
FIG. 4 illustrates a sectional view of a state of assembly after the insulation case is inserted into the can according to an embodiment.

FIG. 3 illustrates a sectional view of a state of assembly before the insulation case is inserted into the can according to an embodiment. FIG. 4 illustrates a sectional view of a state of assembly after the insulation case is inserted into the can according to an embodiment.

Referring to FIGS. 3 and 4, a width [L2+(L3×2)] of the insulation case 70 including the insertion guides 71 may be wider than a width L1 between inner walls of the can 10, which inner walls come into contact with the insertion guides 71. Thus, the insulation case 70 may be force fitted into the can 10.

In particular, the width L2 of the short-side surface 75b of the insulation case 70 may be narrower than the width L1 between the inner walls of the can 10. However, the width [L2+(L3×2)] of the insulation case 70 including the insertion guides 71 may be wider than the width L1 between the inner walls of the can 10.

For example, when the width L1 between the inner walls of the can 10 is 5.0 t, the width L2 of the short-side surface 75b of the insulation case 70 may be 4.9 t and the width L3 of each of the insertion guides 71 protruding from the outer surface 75 of the insulation case 70 may be 0.1 t. Since the insertion guides 71 may be respectively disposed on the pair of long-side surfaces 75a (see FIG. 1) of the insulation case 70, the overall width [L2+(L3×2)] of the insulation case 70 having the insertion guides 71 may be 5.1 t.

Thus, the overall width L2+(L3×2) of the insulation case 70 having the insertion guides 71 thereon may be wider than the width L1 between the inner walls of the can 10. Accordingly, the insulation case 70 may be force fitted into the can 10. Since the insertion guides 71 may be respectively disposed at symmetrically corresponding positions on the opposing long-side surfaces 75a of the insulation case 70, the insulation case 70 may be precisely inserted into a center portion C of the can 10.

Figure 5:
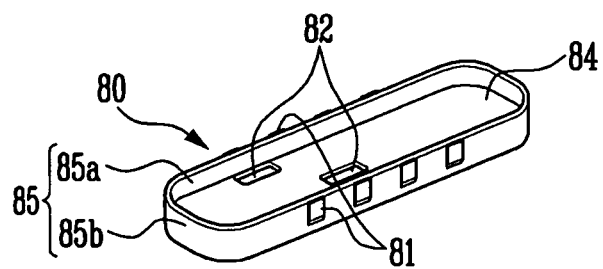
FIG. 5 illustrates a perspective view of an insulation case according to another embodiment.

FIG. 5 illustrates a perspective view of an insulation case according to another embodiment.

Referring to FIG. 5, in the insulation case 80 according to the present embodiment, a plurality of insertion guides 81 may be disposed on one long-side surface 85a of the insulation case 80, which insertion guides 81 may come into contact with a can (not shown). Accordingly, insertion guides 81 may be disposed at symmetrically corresponding positions of the other long-side surface 85a, opposite to the one long-side surface 85a, so that the insertion guides may be arranged symmetric to each other. Here, the insulation case 80 may have a rectangular shape in horizontal cross section. The pair of long-side surfaces 85a and a pair of short-side surfaces 85b may constitute an outer surface 85 of the insulation case 80.

Each of the insertion guides 81 may be spaced apart from a lower surface 84 of the insulation case 80 by a predetermined distance. A lower portion of each insertion guide 81 facing the can may be inclined at a predetermined angle relative to the outer surface 85 of the insulation case 80. Accordingly, when the insulation case 80 is inserted into an upper portion of the can, centering insertion of the insulation case 80 may be smoothly guided. In addition, it is possible to prevent the outer surface 85 of the insulation case 80 from being scratched.

When the plurality of insertion guides 81 are disposed on each of the long-side surfaces 85a, it is possible to easily prevent the insulation case 80 from being inclined toward one of the long-side surfaces 85a when the insulation case 80 is inserted into the can.

Although not illustrated in the figures, in an implementation, insertion guides may be disposed along entire lengths of each of long-side surfaces of the insulation case.

In the secondary battery according to an embodiment, an inner surface of the can may not be scratched by the outer surface of the insulation case, and the insulation case may inserted into the can without being undesirably inclined to one side thereof.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   a can for accommodating an electrode assembly, the can having an opening at one side thereof;
   a cap assembly for sealing the opening of the can;
   an insulation case between the electrode assembly and the cap assembly, the insulation case including a lower surface that is above the electrode assembly and a sidewall extending vertically upwardly from the lower surface, the insulation case being in a force-fitted state within a space at an upper portion of the can defined by an interior wall of the can, the lower surface of the insulation case having a size in a horizontal cross-section prior to force fitting that is larger than the space defined by the interior wall of the can; and
   an insertion guide on the insulation case, the insertion guide having:
      a flat vertical face parallel to the sidewall of the insulation case and to the interior wall of the can, the vertical face being positioned at an upper region of the sidewall of the insulation case such that a lower region of the sidewall is between the insertion guide and the lower surface of the insulation case, the lower region of the sidewall having a surface parallel to the flat vertical face of the insertion guide and parallel to the interior wall of the can; and
      an inclined lower portion facing the can, the inclined lower portion extending between the lower region of the sidewall and the flat vertical face of the insertion guide, the inclined lower portion being inclined at a predetermined angle relative to the sidewall of the insulation case and to the vertical face of the insertion guide such that a thickness of the insertion guide increases between the lower region of the sidewall and the flat vertical face of the insertion guide in a direction away from the lower surface of the insulation case.

2. The secondary battery as claimed in claim 1, wherein the predetermined angle is about 30 to about 70 degrees.

3. The secondary battery as claimed in claim 1, wherein the insulation case:
   has a rectangular shape in horizontal cross section, and
   has a pair of short-side surfaces and a pair of long-side surfaces, the insertion guide being disposed on each of the pair of long-side surfaces.

4. The secondary battery as claimed in claim 3, wherein the insertion guide is disposed at corresponding positions of the long-side surfaces symmetrically opposite to each other.

5. The secondary battery as claimed in claim 3, wherein the rectangular shape in horizontal cross section has rounded corners.

6. The secondary battery as claimed in claim 1, wherein the insertion guide includes a plurality of insertion guides disposed on opposing long-side surfaces of the insulation case, the plurality of insertion guides on one of the long-side surfaces corresponding symmetrically to the plurality of insertion guides on the other opposing long-side surface.

7. The secondary battery as claimed in claim 1, wherein the insertion guide includes a plurality of insertion guides that extend along entire lengths of opposing sides of the sidewall of the insulation case.

8. An insulation case for insulating between an electrode assembly in a can and a cap assembly sealing the can of a secondary battery, the can having an interior wall, the insulation case comprising:
   a lower surface for disposition above the electrode assembly in a space defined by the interior wall of the can, the lower surface having a size in a horizontal cross-section that is larger than the space defined by the interior wall of the can;
   a sidewall that protrudes above the lower surface; and
   an insertion guide on the insulation case and having:
      a flat vertical face parallel to the sidewall of the insulation case and to the interior wall of the can, the vertical face being positioned at an upper region of the sidewall of the insulation case such that a lower region of the sidewall is between the insertion guide and the lower surface of the insulation case, the lower region of the sidewall having a surface parallel to the flat vertical face of the insertion guide and to the interior wall of the can; and
      an inclined lower portion extending between the lower region of the sidewall and the flat vertical face of the insertion guide, the inclined lower portion being inclined at a predetermined angle relative to the sidewall of the insulation case and to the vertical face of the insertion guide such that a thickness of the insertion guide increases between the lower region of the sidewall and the flat vertical face of the insertion guide in a direction away from the lower surface of the insulation case.

9. The secondary battery as claimed in claim 1, wherein the sidewall of the insulation case extends around a periphery of the lower surface of the insulation case and around the interior wall of the can.

10. The secondary battery as claimed in claim 1, wherein an entirety of the insertion guide is between the sidewall of the insulation case and the interior wall of the can.

11. The secondary battery as claimed in claim 10, wherein the entirety of the insertion guide is contiguous with the sidewall of the insulation case.

* * * * *